Figure 1:
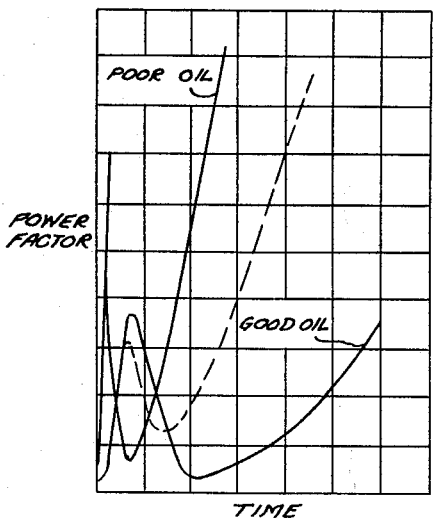

May 26, 1964  F. C. DOBLE ET AL  3,134,936
CAPACITOR TEST CELL FOR OXIDATION TESTING OF OIL
Original Filed Sept. 25, 1959

United States Patent Office 3,134,936
Patented May 26, 1964

---

3,134,936
CAPACITOR TEST CELL FOR OXIDATION TESTING OF OIL
Frank C. Doble, Belmont, and Frederick S. Oliver, Reading, Mass., assignors to Doble Engineering Company, Belmont, Mass., a corporation of Massachusetts
Original application Sept. 25, 1959, Ser. No. 842,497, now Patent No. 3,037,164, dated May 29, 1962. Divided and this application Sept. 27, 1961, Ser. No. 146,680
2 Claims. (Cl. 317—246)

This invention relates to accelerated oxidation testing of insulating oil and, more particularly, it is concerned with measurements indicative of an A.-C. loss characteristic of the oil during the course of an accelerated-oxidation test. This application is a division of our application Serial No. 842,497, filed September 25, 1959, now Patent No. 3,037,164.

A disadvantage of oil as an insulator is that it deteriorates in use so that after a time it must be replaced in order to minimize the risk of an electrical failure. This is especially important in power systems where insulating oils are used in such devices as transformers, capacitors, cables, and switch gear, and where a single failure may result in a substantial interruption of service. The problem is how to determine the point at which an insulating oil is no longer safe to use. Heretofore changes in the A.-C. loss characteristics of an oil have been found to provide a good indication of its electrical state provided that A.-C. loss characteristics measurements are made often enough to define the changes accurately.

According to the present invention, it is proposed to provide novel methods and apparatus capable of performing accelerated life tests on insulating oil samples, and thereby determine in advance an oil's A.-C. loss characteristics over its useful life. Thus, these tests provide valuable information as to the relative merits of different kinds of oils as useful insulators in advance and without risking damage to expensive power equipment, as well as permitting the selection of an oil having preferred characteristics for a specified service. These novel results are accomplished in the present invention by accelerating the deterioration of insulating oil samples by continuously passing air through them in the presence of a metallic catalyst such as copper or iron or both, and then periodically measuring the A.-C. loss characteristics of the oil at the same time and in the same cell wherein the oil is undergoing continuous oxidation. This novel technique permits a high degree of control as contrasted with conventional techniques where samples must be removed for test, and thus only occasional tests are made which are subject to the errors attendant on any sampling method.

In order most effectively to carry out the methods of the invention, there is also provided novel apparatus including a novel test cell especially adapted for simultaneous electrical measurement and oxidation, to establish its A.-C. loss characteristics throughout its useful life, usually until a precipitate or sludge first appears.

It is an especially important object of the present invention to provide highly precise apparatus of this character.

The novel features of the invention together with further objects and advantages thereof will become apparent from the following detailed description of preferred embodiments thereof and from the drawings to which it refers.

Figure 2:
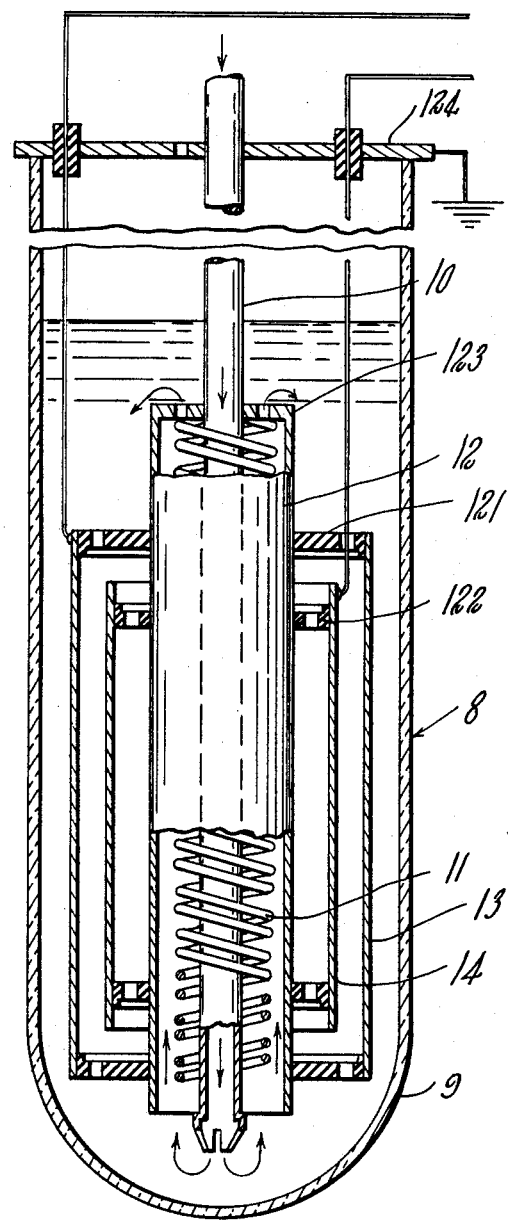

In the drawings:

FIG. 1 is a graph showing A.-C. loss characteristics-time curves of various oils while undergoing continuous oxidation according to the present invention; and FIG. 2 is a sectional view of a novel continuous oxidation test cell according to the present invention.

Referring to the drawings, in FIG. 1 is shown a number of typical A.-C. loss characteristics-time curves of oils measured by the methods of the present invention utilizing, say, a test cell such as is shown in FIG. 2. Such test cell, generally designated 8, includes a central downwardly extending air tube 10, a surrounding coil 11, or coils, usually of copper or iron or both, an inner electrode 12, outer electrode 13 and middle electrode 14, these elements being immersed in the oil to be tested contained within a suitable surrounding jar 9.

In accordance with the methods of the invention for evaluating oil in terms of an A.-C. loss characteristics-time tests, the body of oil to be measured is maintained in jar 9 with its level above the tops of the electrodes 12, 13 and 14 as is shown in FIG. 2, and may be heated if desired to achieve a uniform temperature, 95° C. being common. A continuous stream of an oxygen-containing gas, usually air, is continuously passed from a suitable source, not shown, through central tube 10 and emerges from said tube through an accurately dimensioned jet adjacent the bottom of the container at the lower end of the concentric electrodes in small bubbles or other finely divided form for free flow vertically upwardly through the body of the oil in the catalyst-containing volume between the tube 10 and inner electrode 12 generally along the central vertical common axis of the concentric electrodes. The rate of flow is kept uniform by maintaining the same pressure on each accurately dimensioned jet and, therefore, each and every tube is exposed to the same rate of air flow. The upward movement of the bubbles also causes a flow of oil as is shown by the arrows in FIG. 2 around the top of the inner electrode and downwardly between the intermediate electrode and both the inner and outer electrodes. Thus, the electrical measuring element, basically the middle and outer electrodes, since the inner electrode is electrically guard-grounded, is remote from the upwardly flowing bubbles, any electrical measurements taken between the intermediate electrode and the outer electrode are not affected by the continuous flow of gas upwardly through the cell, even though they are continuously washed by oil flowing from the oxidation region of the cell to the remote electrical measuring region thereof and downwardly past the middle and outer electrodes. Under these conditions, it is possible to measure an electrical loss characteristic of the oil, such as its dissipation factor, simultaneously with continuous oxidation of the oil in the same cell.

More specifically as to cell 8, its three electrodes 12, 13 and 14 are seen to comprise hollow cylinders joined by spacer members 121, 122 in a coaxial array. Spacer members 121, 122 are made of a suitable insulating material such as styrene plastic whereas the electrodes themselves are of inert metal such as stainless steel or plated active metals such as brass so that they will be inert in the presence of oil although one or more of the electrodes may be copper and used to replace the separate catalyst coil. Also, it should be noted that the outer and middle electrodes 13 and 14 are each directly supported from the inner electrode 12 by their spacers 121 and 122 respectively. This is important in order to measure only the characteristics of the oil. The inner electrode 12 is supported on tube 10 by a metallic spacer 123 so that it is electrically connected to said tube for guard-grounding therethrough. The oil is held in a jar 9 of glass wherein the above described electrode assembly is suspended by means of a metallic top plate 124 and is submerged beneath the surface of the oil. In order to accelerate the process of deterioration that the oil normally undergoes in service, there is provided a catalyst 11 within the inner electrode which may be in the form of a coil 11 of copper or iron wire or both, and dry air is passed through it. The catalyst may conveniently take the form of a bifilar helix 11 of iron and copper which is retained on air tube 10. The tube 10 is supported coaxially within the electrode 12 by its spacer 123 and has its outlet end slightly above the lower end of jar 9. As a consequence, air bubbles pass up through the grounded inner electrode 12 where the turbulence created thereby has substantially no effect on the electrical measurement of A.-C. loss characteristics conducted in a region remote therefrom in the dielectric space between electrodes 13 and 14. It has also been found desirable to elevate the temperature of the cell and others like it. This may be accomplished by the provision of a tank of hot liquid (not shown) in which the containers are immersed.

Those skilled in the art will appreciate that the apparatus described in detail herein by way of example can be modified in various ways without departing from the spirit and scope of the invention.

What is claimed is:

1. A cell for measuring an electrical loss characteristic of an electrical insulating oil while undergoing continuous oxidation comprising a container for maintaining therein a body of oil to be measured, an electrode system immersed in said body of oil, said system consisting of at least two vertically arranged radially spaced electrodes in generally coaxial relationship to one another and having a central vertical axis, gas supply means having a gas outlet opening located at a position substantially below the top of at least the inner of said electrodes and on the central vertical axis of said electrode system supplying a stream of oxygen-containing gas to said oil, and vertically spaced upper and lower passageway means communicating with a central region within the inner of said electrodes and surrounding said central axis and a region between said spaced concentric electrodes, said cell providing for free flow of said gas upwardly in a stream generally vertically along said central axis, said electrodes surrounding said central axis and said stream of gas, said stream of gas being maintained entirely within the innermost of said electrodes to cause upward flow of oil in the region within said innermost electrode and downward flow of oil in the region outwardly of said innermost electrode, and radial flow through said passageway means to recirculate said oil.

2. A cell as claimed in claim 1 wherein said gas supply means comprises a central tube coaxial with said electrodes, said tube extending downwardly within said container and having an open outlet and located at a position substantially below the top of at least the inner of said electrodes.

References Cited in the file of this patent
UNITED STATES PATENTS

| | | |
|---|---|---|
| 2,599,583 | Robinson et al. | June 10, 1952 |
| 2,752,543 | Smith | June 26, 1956 |
| 2,800,628 | Stinson | July 23, 1957 |

FOREIGN PATENTS

| | | |
|---|---|---|
| 941,082 | Germany | Apr. 5, 1956 |